United States Patent [19]

Haag et al.

[11] Patent Number: 4,479,197

[45] Date of Patent: Oct. 23, 1984

[54] METHOD AND APPARATUS FOR SELECTING AND SETTING THE MODE OF OPERATION FOR A MECHANISM

[75] Inventors: George A. Haag, Colorado Springs; O. Douglas Fogg, Loveland; Gordon A. Greenley; Steve A. Shepard, both of Colorado Springs, all of Colo.; F. Duncan Terry, Meridan, Id.

[73] Assignee: Hewlett-Packard Company, Palo Alto, Calif.

[21] Appl. No.: 454,387

[22] Filed: Dec. 29, 1982

Related U.S. Application Data

[60] Division of Ser. No. 210,462, Nov. 25, 1980, Pat. No. 4,373,193, which is a continuation of Ser. No. 75,787, Sep. 17, 1979, abandoned, which is a division of Ser. No. 828,138, Aug. 29, 1977, abandoned.

[51] Int. Cl.$^3$ .............................................. G06F 3/153
[52] U.S. Cl. .................................... 364/900; 340/712
[58] Field of Search .............. 340/707, 709, 712, 525; 364/200, 900, 188; 343/5 EM

[56] References Cited

U.S. PATENT DOCUMENTS

| | | | |
|---|---|---|---|
| 3,524,182 | 8/1970 | Criscimagna et al. | 340/709 |
| 3,543,269 | 11/1970 | Dudley | 343/5 EM |
| 3,757,037 | 9/1973 | Bialek | 340/712 |
| 4,001,807 | 1/1977 | Dallimonti | 340/525 |
| 4,193,119 | 3/1980 | Frase et al. | 364/900 |
| 4,303,973 | 12/1981 | Williamson, Jr. et al. | 340/712 |
| 4,310,839 | 1/1982 | Schwerdt | 340/709 |
| 4,396,977 | 8/1983 | Slater et al. | 364/188 |
| 4,399,502 | 8/1983 | MacDonald | 364/900 X |

Primary Examiner—Harvey E. Springborn
Attorney, Agent, or Firm—Edward L. Miller

[57] ABSTRACT

The operating modes and parameters of a logic state analyzer are selected by user interaction with a menu displayed upon a CRT. At the highest level of control the user may specify which menu is of interest, should there be more than one. The selected menu is displayed and contains mode selection fields whose labels indicate the various modes that are presently selected. Different modes are selected by positioning a cursor to the associated selection field and then pressing a mode selection key. Each such activation causes the next mode in a sequence of modes, associated with that particular field, to be the selected mode of operation. A descriptive label or phase corresponding to the selected mode is displayed as part of the selection field containing the cursor. The modes and their associated labels are linked in a cyclic order, and repeated activation of the field select key will cycle through the cyclic sequence indefinitely, revealing to the operator what his choices are, as well as indicating the present choice. The cursor may be positioned in random order among several such mode selection fields, but only one field select key is needed, as its above-described action pertains to whichever field contains the cursor. The cursor may also be positioned to parameter entry fields associated with selected modes, and a collection of parameter entry keys allows entry of associated parameters.

18 Claims, 16 Drawing Figures

FIGURE 1

```
--------FORMAT SPECIFICATION--------TRACE-COMPLETE---------------------
```

CLOCK SLOPE [+]
(+,-)

```
            POD        POD4       POD3       POD2       POD1
            PROBE      7------0   7------0   7------0   7------0
LABEL ASSIGNMENT       |AAAAAAAA| |AAAAAAAA| |DDDDDDDD| |XXXXXXXF|
(A,B,C,D,E,F,X)         !!!!!!!!   !!!!!!!!   !!!!!!!!   !!!!!!!!
                                    ACTIVE CHANNELS
```

```
            LABEL        A      D      F
LOGIC POLARITY          [+]    [+]    [+]              ┌──┐ DESIGNATES A
   (+,-)                                               └──┘ SELECTABLE
NUMERICAL BASE          [HEX]  [HEX]  [BIN]                 ENTRY FIELD
 (BIN,OCT,DEC,HEX)
```

FIGURE 2

```
--------TRACE SPECIFICATION--------TRACE-COMPLETE---------------------
```

```
             LABEL      A     D   F    OCCUR
             BASE      HEX   HEX BIN   DEC
FIND IN SEQUENCE      |03CF| |XX||X|  |00002|
          THEN        |03E2| |XX||X|  |00003|
          THEN        |00E1| |XX||X|  |00001|
[ START] TRACE        |03E3| |XX||X|  |00001|

SEQ RESTART [ON]      |03E4| |XX||X|

TRACE
   [ONLY STATE]       |03E1| |XX||X|  |00001|

COUNT  [STATE]        |03E1| |XX||X|
```

FIGURE 3

```
------------TRACE LIST--------TRACE-COMPLETE-------------------
```

```
        LABEL    A     D    F    STATE COUNT
        BASE    HEX   HEX  HEX       DEC
                                    [REL]
   SEQUENCE...03CF...6D...0...
   SEQUENCE    03E2   A2   0              2
   SEQUENCE    00E1   C6   0              3
      START    03E3   82   0              1
        +01...03E3...E1...0...............1
        +02    03E3   E5   0              1
        +03    03E4   82   0              1
        +04    03E4   03   0              1
        +05...03E4...47...0...............1
        +06    03E1   A2   0              1
        +07    03E1   1D   0              1
        +08    03E1   5D   0              1
        +09...03CE...5D...0...............1
        +10    03CE   44   0              1
        +11    03E2   A2   0              1
        +12    03E2   C2   0              1
        +13...03E2...C6...0...............1
        +14    00E1   C6   0              1
        +15    03E3   82   0              1
        +16    03E3   E1   0              1
```

METHOD AND APPARATUS FOR SELECTING AND SETTING THE MODE OF OPERATION FOR A MECHANISM

References to Related Applications

This application is a division of an earlier filed co-pending application Ser. No. 210,462, filed on Nov. 25, 1980 by George A. Haag, et al., amended to be entitled LOGIC STATE ANALYZER WITH STORAGE QUALIFICATION, and now issued as of Feb. 8, 1983 as U.S. Pat. No. 4,373,193. That application was a continuation of application Ser. No. 75,787 entitled LOGIC STATE ANALYZER filed Sept. 17, 1979 by the same inventors, and which is now abandoned. That application was in turn a division of a now abandoned application of the same inventors and title, Ser. No. 828,138, filed on Aug. 29, 1977. Each of the above patents and applications is assigned to Hewlett-Packard Co., as is the present application.

The subject matter of the present application is also related to the subject disclosed in U.S. Pat. No. 4,040,025, issued to Justin S. Morrill, Jr., on Aug. 2, 1977, and which was filed on Mar. 31, 1976. U.S. Pat. No. 4,040,025 is assigned to Hewlett-Packard Co.

The subject matter of the present application is also related to the subject disclosed in U.S. Pat. No. 4,100,532, issued to William A. Farnbach on July 11, 1978, and which was filed on Nov. 19, 1976. U.S. Pat. No. 4,100,532 is assigned to Hewlett-Packard Co.

U.S. Pat. Nos. 4,040,025 and 4,100,532 to Morrill, et al. and Farnbach respectively, are hereby expressly incorporated by reference.

Background and Summary

The first logic state analyzers had upon their front panels separate and discrete physical controls whose manual settings represented the various selectable modes of operation as well as the particular values of any parameters associated therewith. For example, in the Hewlett-Packard Model 1600 Logic State Analyzer (portions of which are described in U.S. Pat. Nos. 4,040,025 and 4,139,903) various operational modes are selected by activating push-to-set/push-to-release type switches, while various parameters are determined by thumb wheel rotary switches and a bank of toggle switches arranged as a "switch register."

This approach is not suitable for today's more sophisticated Logic State Analyzers. There are simply too many modes and too many associated parameters to consider equipping such an analyzer (or other item of electronic equipment with similar diversity of mode selection and parameter specification) with a front panel having a discrete control for each mode and parameter.

According to a preferred embodiment of the invention a CRT display is used in conjunction with certain keys on a keyboard to allow the selection of the various modes and the specification of the various parameters. A displayed arrangement of the choices to be made may be referred to as a menu. In a relatively simple situation a single menu may suffice; in the instant disclosed embodiment two are required. Selection of one of the two menus is analogous to focusing attention on only a certain part of a front panel. For the Logic State Analyzer described in the present embodiment the two menus are for describing a "format specification" that tells how to group and electrically interpret the electrical signals monitored by the analyzer, and for describing a "trace specification" that tells what logical conditions in the monitored data are of interest.

According to a preferred embodiment described by the following specification and appendices the separate menus are fetched into the display upon activation of separate respective menu selection keys. Once a menu is in the display a cursor may be positioned to various mode selection fields. Each such field includes a displayed legend or descriptive phrase that indicates the selected mode. A mode selection key is activatable to cause the displayed legend or phrase to be replaced by a different one. Each time a new legend or phrase appears in the mode selection field the corresponding appropriate changes with the internal configuration of the instrument are also made, so the instrument operates according to the mode indicated.

The legends or descriptive phrases for a given mode selection field are associated but separate and distinct members of a sequence, of which only one member at a time is indicated for that field. Repeated activation of the mode selection key cycles through the sequence one legend or phrase at a time. Such cycling allows the operator to familiarize himself with each of the possibilities, even though they may not all be simultaneously visible. This is roughly analogous to inspecting the lettering on a traditional front panel. The cycling process is continued until such time as the legend or phrase corresponding to the desired mode is indicated in that mode selection field.

Once conditions in one mode selection field have been specified the cursor may be moved to a different mode selection field. Then the mode selection process may be continued using the same mode selection key to further select another mode from an altogether different sequence of possibilities.

A menu may include parameter entry fields, which are used by positioning the cursor thereto and keying in the parameter in a conventional manner.

Once the modes and parameters in one menu have been selected the other menu can be selected and further actions taken to further define the operation of the analyzer. And inasmuch as each menu is merely some convenient representation of an imaginary front panel whose control settings are represented by the contents of certain locations in a memory, the operator may "hop back and forth" between menus, and in principle, establish from among all the menus the modes and parameters in any order that is convenient.

Description of the Figures

FIG. 1 illustrates the interactive format specification display.

FIG. 2 illustrates the interactive trace specification display.

FIG. 3 illustrates a trace list display of the stored data states.

Mode Selection and Parameter Entry

Various modes of operation are described below. The desired modes of operation are selected from various pluralities of associated possibilities. Some of the possible selections either permit or require the entry of one or more associated parameters. One of a plurality of menus representing the mode selections and parameter entries to be made appears upon the CRT display 1000 of FIG. 7. FIGS. 1 and 2 are illustrations of such menus. Those menus represent mode and parameter selections pertaining to the notions of "format specification" and "trace specification", respectively. Those notions are explained below; at present we are concerned not with their meaning to a logic state analyzer, but with the mechanics of selecting the modes and entering the parameters presented in any particular menu. A particular menu is selected by pressing one of the FORMAT SPECIFICATION or TRACE SPECIFICATION keys upon the keyboard of FIG. 6. See also Appendix A.

Figure 6:
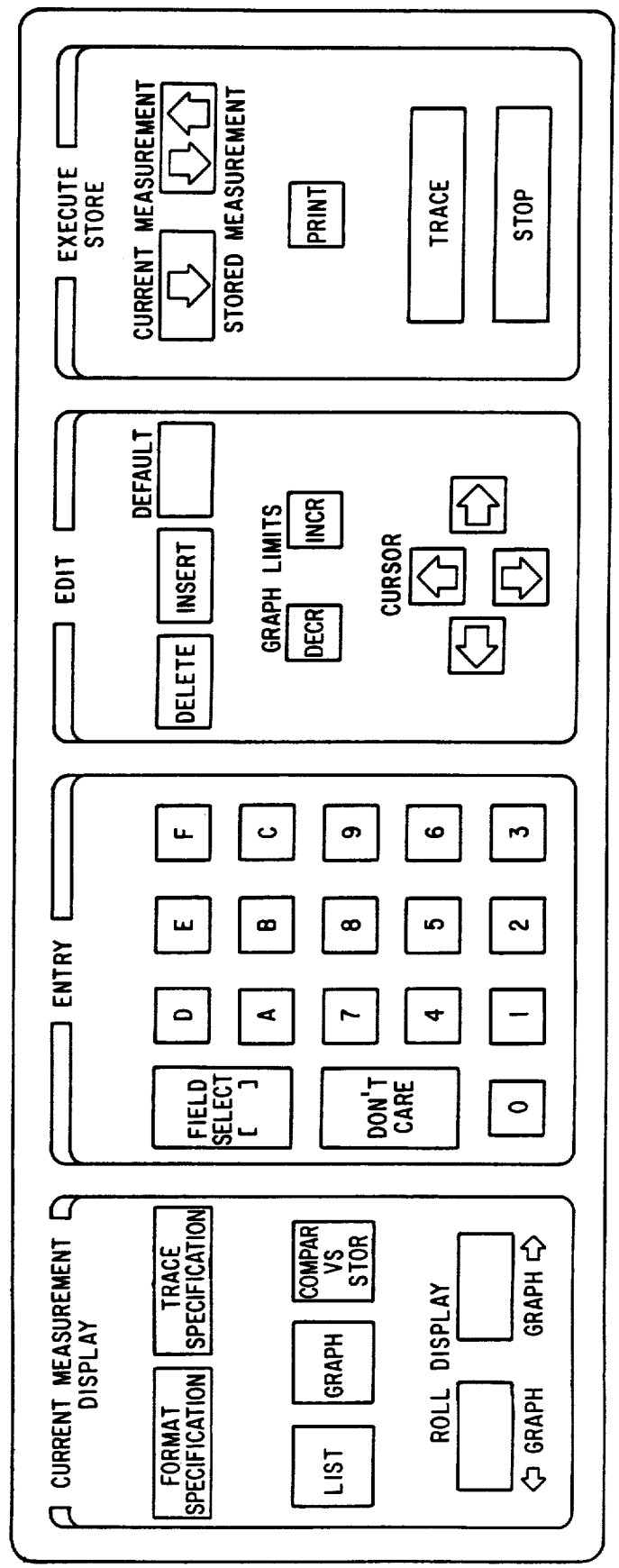
FIG. 6 illustrates the input keyboard.

Once a chosen menu is present in the display a cursor may be positioned to preselected locations in the menu by appropriate activation of the cursor "arrow keys" in the EDIT block of keys upon the keyboard of FIG. 6. The cursor is a blinking inverse video field. See also Appendix A.

Referring now to FIGS. 1, 2, and 6, and to Appendix A, the blinking inverse video cursor is positionable among the inverse video fields shown as rectangular boxes in FIGS. 1 and 2. Some of the inverse video fields contain legends enclosed within brackets; e.g., [HEX] and [BIN] in FIG. 1. These are legends representing selected modes of operation. The legends within these bracketed fields are changed as different modes of operation are selected by pressing the FIELD SELECT [] key. The change occurs in the field containing the blinking cursor.

Fields without brackets represent locations to which the cursor may be positioned and then the keys 0-9, A-F and X used to enter a parameter.

Examples of how these techniques are used in the operation of the instant logic state analyzer are found throughout Appendix B.

Format Specification

Data formatting permits the partitioning of 32 input data channels into parameters of interest. Contiguous data channels which behave as a single parameter may be assigned to one of six labels (A-F). For example, in FIG. 1, illustrating the interactive format specification display, 16 bits of an address bus have been assigned to label "A", 8 bits of a data bus have been assigned to label "D", 1 bit of data on pod 1 has been assigned to label "F", and 7 bits have been left unassigned (labeled "X"). Further specifications and data manipulations are made by referencing these labels. Each assigned label may be independently declared to have a positive or negative "logic polarity" and converted to an independently selected radix which can be binary, octal, decimal or hexadecimal. Further, the slope of the positive or negative clock transition at which time the input data channels are sampled can be selected ("clock slope").

Figure 15:
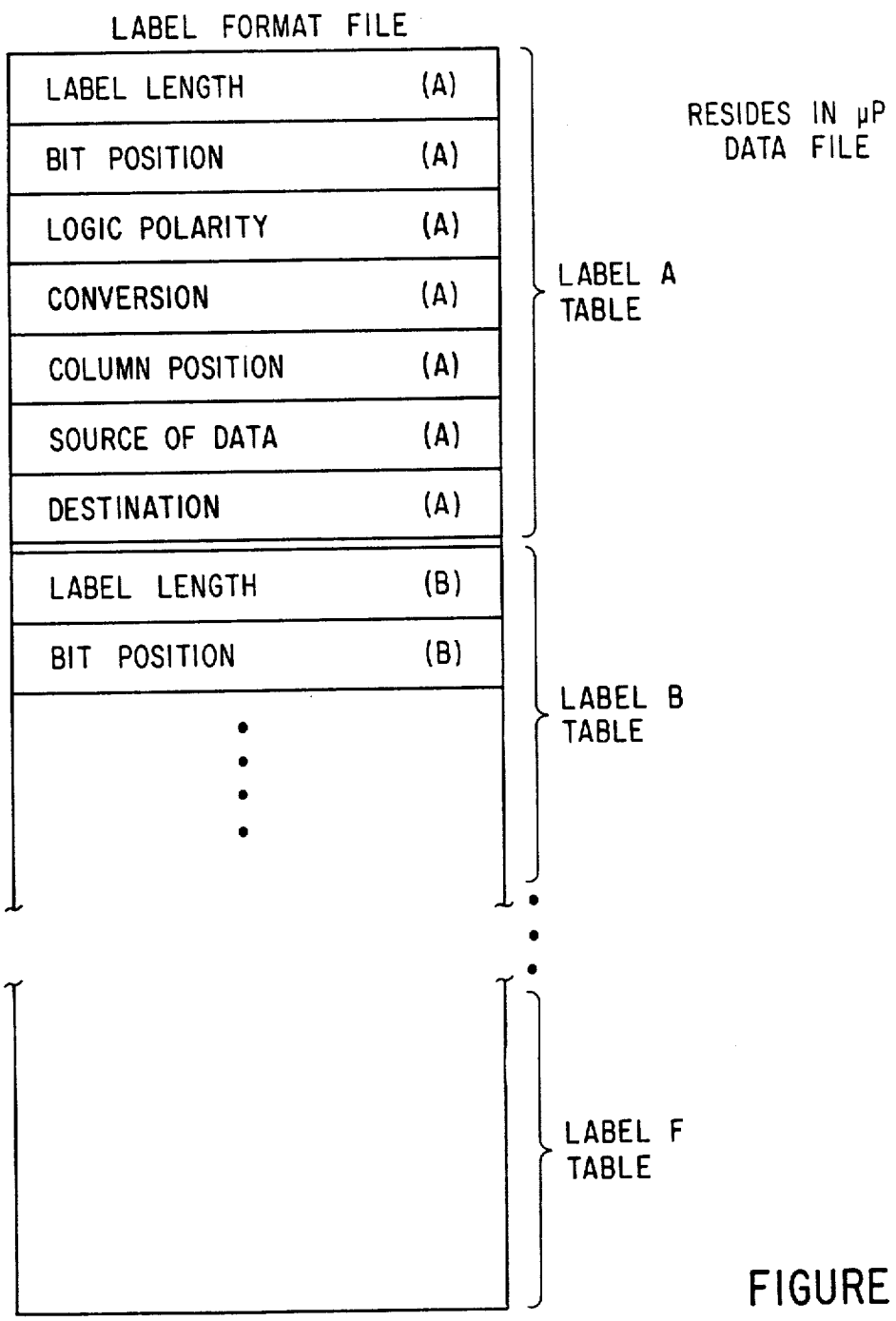
FIG. 15 illustrates the format of the label format file.
Figure 16:
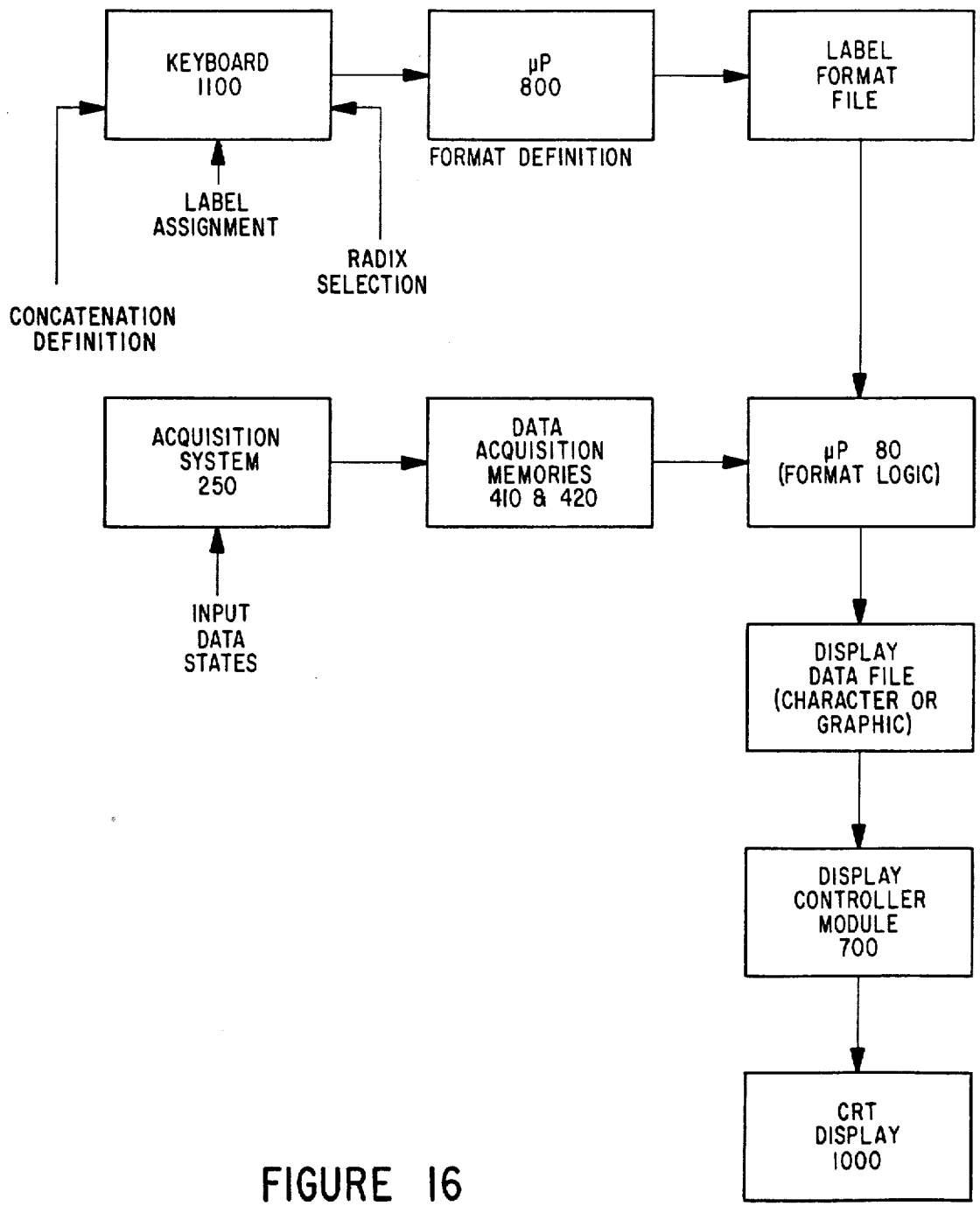
FIG. 16 illustrates the logic flow of the display formatting logic.

Keyboard entries to the microprocessor 800, as shown in FIG. 16, permit the construction of the label format file, shown in more detail in FIG. 15 which, contains the format specification parameters. This is used to process the stored data states in the construction of the alphabetically concatenated ASCII display data file and the graphic display data file. Either of the display data files is subsequently selected and used for display purposes by the display control module 700 and the CRT display 1000.

Trace Specification

The assigned input data channels are sampled at the specified clock transitions and are treated as one sampled state. The trace specification defines which of the sampled states are to be stored for display and which sampled states are to be counted for count measurements. The trace specification comprises a definition of state conditions specifying the trace position, the selective trace, and the count measurement. Each state condition defines a state of the assigned input data channels in any combination of 1's, 0's, and/or X's (dont't care). In octal, decimal or hexadecimal bases the definition is defined in terms of the appropriate alphanumerics and X's.

A trace position may be selected to a start, center or end the selective trace in response to the input data satisfying a predefined state sequence. In this description it will be assumed that the trace position starts the selective trace. A state sequence of up to seven state conditions must be satisfied in a specified order, ignoring intermediate states which do not satisfy the state sequence. The simplest state sequence is a single state condition. Specific segments of branched, looped or nested forms of state flow may be directly located by properly defined state sequences. In addition, each state condition in a state sequence may be required to occur from 1 to 65536 times before the state condition is satisfied. This form of positioning will locate the nth pass of a loop beginning at a given state condition. Clock delay may be incorporated by defining the nth occurrence of any state (an all don't care state specification). The trace logic may also be specified to restart the satisfaction of the predefined state sequence if it is not satisfied before or concurrently with the location of a predefined restart state condition. A restart on "any state" requires that the state sequence be satisfied without any unspecified intermediate states. For example, FIG. 2 illustrates the interactive trace specification display for a trace position starting upon the satisfaction of 4 state conditions in sequence. A restart state condition is also defined.

The selective trace is a qualification to determine which sampled states will be stored for display. One to seven state conditions may be "OR" specified for collection. Selectively tracing only sampled states of interest eliminates the clutter of unneccessary states and magnifies the apparent size of the trace beyond its 64 terms. Also, an occurrence term may be specified so as to store only every nth satisfaction of an "OR" specified state condition. FIG. 2 illustrates the selective trace of every occurrence of a single state condition.

The count measurement performs a "time" or a "state" count associated with each of the (64) states stored and can be displayed in one of two formats:

absolute—the count from the trace position relative—the count from the previous trace state The time count is perfomed by counting the occurrences of an internal clock between sequentially stored states and the display is in the units of seconds. A state count similarly counts the number of occurrences of a specified state condition ("count") between sequentially stored states. For example, specifying "any state" would result in a count of the selected clock transitions of the input data. In FIG. 2, a state count is performed on the occurrences of a specified state condition intermediate to each sampled state stored.

Internal Measurement Storage

One complete measurement of 64 sampled states, which includes the sampled states satisfying the state conditions defining the state sequence and specifications of the format, trace, and display, may be internally stored. This "current measurement" may be stored or exchanged with a "stored measurement" for later analysis. A "trace compare" mode of operation (described more fully below) compares results of a previously stored trace with the current measurement and may be utilized as a further qualifier on data storage.

Display Specification

The output display format of the current measurement may be selected from a trace list, a trace graph, or a trace compare.

A trace list, illustrated in FIG. 3, displays a listing of the stored states in their order of occurrence. Twenty trace states, (one per line) are simultaneously presented on the CRT display. The "ROLL" keys allow scanning of the 64 stored states. Each line comprises a line number, the stored state alphabetically sorted into assigned labels in their numerical base, and the time or state count if selected.

Figures 4, 5:
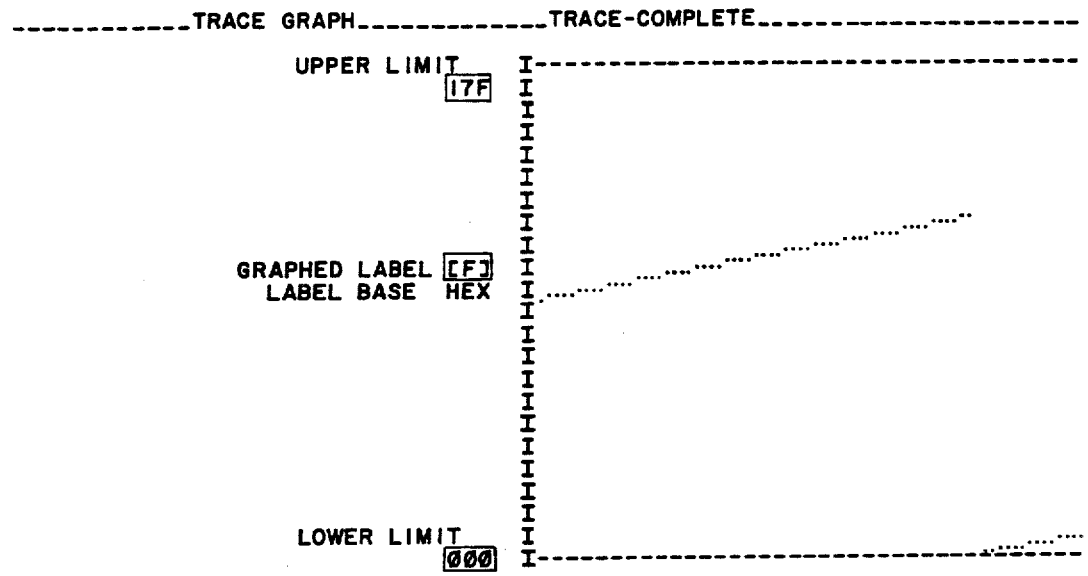
FIG. 4 illustrates a trace graph display of the stored data states.
FIG. 5 illustrates a trace compare output display list.

A trace graph, as shown in FIG. 4, presents a graph of the data magnitude of a specified label versus the storage location for all 64 stored states. Each state is given a vertical displacement corresponding to its binary magnitude and an increasing horizontal displacement for successive states in order of their occurrence. The result is a waveform analogous to oscilloscope displays of voltage magnitude. The label to be graphed is selected by specifying the "graphed label". Scaling of state magnitude is controlled by specifying the "upper limit" and "lower limit" on the vertical axis. Limits can be specified directly or dynamically varied with logrithmic autoranging controls. These facilities allow any portion of a graph to be magnified to a full scale presentation. The 20 points corresponding to the lines viewed in the trace list are intensified. The intensified portion also responds to the "ROLL" controls, and their corresponding absolute value may be read in the trace list.

A trace compare as illustrated in FIG. 5 presents a tabular listing of the difference between results in the "current measurement" and the data in the "stored measurement". The listing is formatted and rolled as in the trace list. The results of the two measurements are exclusive OR'ed such that indentical corresponding bits are displayed as zeros and unequal bits are displayed as ones. In an octal base a "03" is equivalent to a binary "000 011" and indicates that the right two bits are different in the two measurements. Trace compare also offers a "compared trace" mode which reruns a measurement until the current and stored measurement are either equal or not equal. (STOP=, or STOP≠) For example, in FIG. 5 of the instrument has rerun trace measurements until the "current measurement" equaled the "stored measurement", as indicated by the "STOP=" specification and revealed by the array of "O"'s in the comparison.

TRACE MODES

Three trace mode options are provided. "Trace" executes a single current measurement. "Continuous trace" repeats the execution of a current measurement continuously. "Compared trace" repeats the execution of a current measurement until the desired comparison with the stroed measurement is obtained.

CLOCK ENABLE AND TRIGGER OUTPUTS

A trigger output provides a triggering pulse for external instrumentation such as oscilloscopes. A 50 ns pulse is generated each time the trace position is found. The clock enable output is useful for gating clocks or interrupting the device under test. A high signal level indicates that the instrument is actively searching for the trace position. It remains at the high signal level until the trace position has been found or the halt key is depressed. Both outputs are suspended when the format specification is displayed to allow measurement of channel activity.

KEYBOARD AND SPECIFICATION DESIGNATION

Referring again to FIG. 6, an illustration of the keyboard, the keys are functionally segregated into four blocks labeled thus: CURRENT MEASUREMENT DISPLAY, ENTRY, EDIT AND EXECUTE. A power up sequence initially defines a default set of specifications, displays the default format specification, then automatically selects a hexadecimal trace list display. Activation of the "ROLL DISPLAY" keys permits the presentation of any portion of the 64 states stored. As previously explained, to define or edit the format specification the "FORMAT SPECIFICATION" key is pressed. The CURSOR keys in the EDIT block are used to move the cursor, designating a selectable entry field by a blinking inverse video field on the interactive display.

The trace specification can be edited by selecting the trace specification interactive display by activating the TRACE SPECIFICATION key. Editing is accomplished in the same manner as the format specification is edited. A general description of the functions of the individual keys is given in Appendix A. A detailed description of the interactive display entry fields is given in Appendix B.

DETAILED DESCRIPTION

Figure 7:
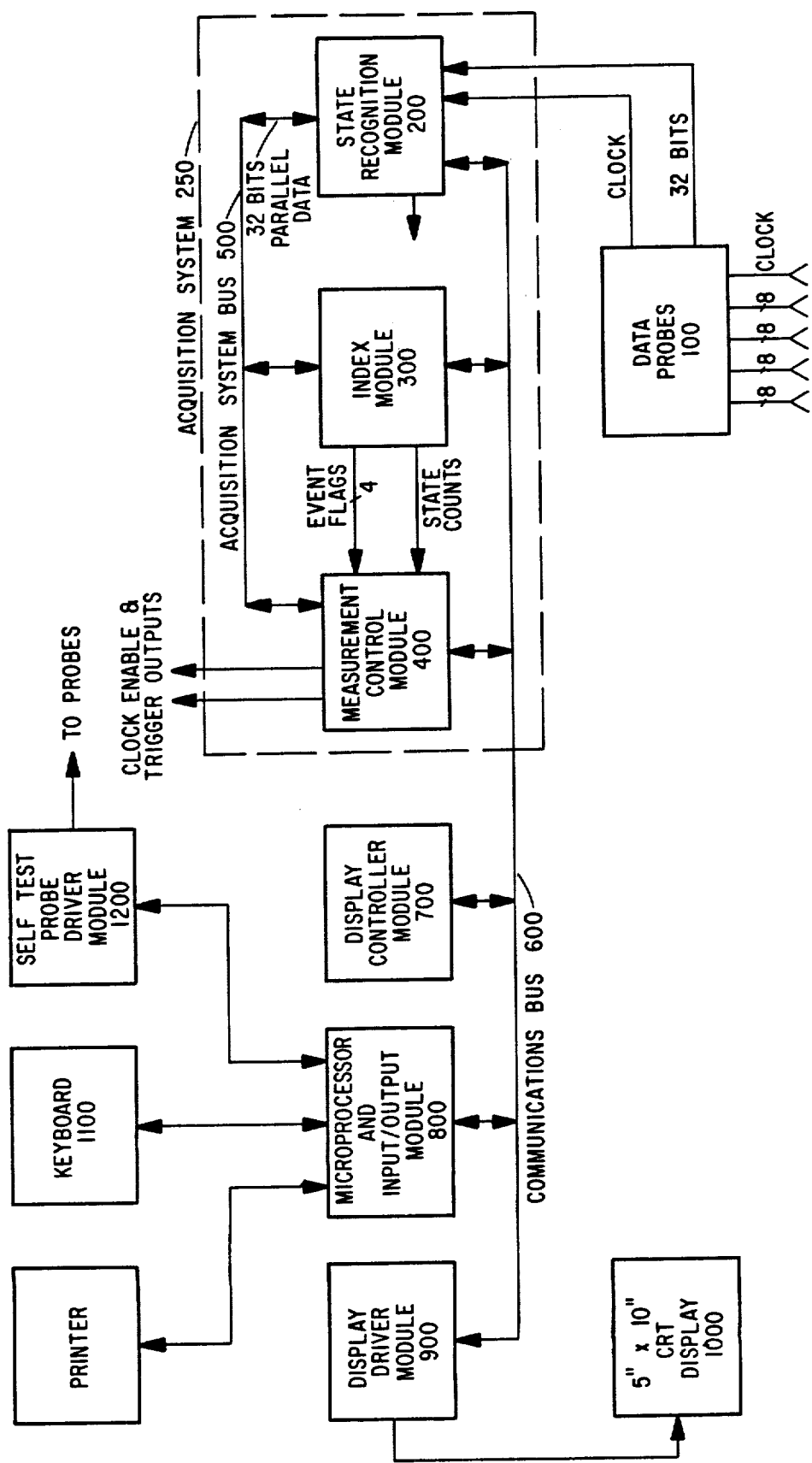
FIG. 7 illustrates a block diagram of the present invention.

Input states are sensed through 32 high impedance variable threshold data probes at rates up to 10 MHz. The data probes 100, illustrated in FIG. 7, are segmented into four 8 bit data pods and a fifth pod for clock sensing. Each pod may be preset to TTL logic threshold or variably adjusted in the range of +10 to −10 volts to interpret input logic levels.

The 32 input data channels and the clock signal from the data probes 100 are input to the state recognition module 200. An internal sampling clock is generated in response to the selected clock slope, the input data signals are compared to the selected threshold voltages and interpreted, and the data signals are latched in response to occurrences of the internal sampling clock. The state recognition module 200 outputs the sampled state to the high speed acquisition system bus 500. The index module 300 accesses the sampled state on the acquisition system bus 500, compares the sampled state to the selected state conditions and determines the trace position, selective storage events and state count events. The measurement control module 400 also accesses the acquisition system bus 500 and stores state or time counts and sampled data states in response to the events detected by the index module 300.

Figure 8:
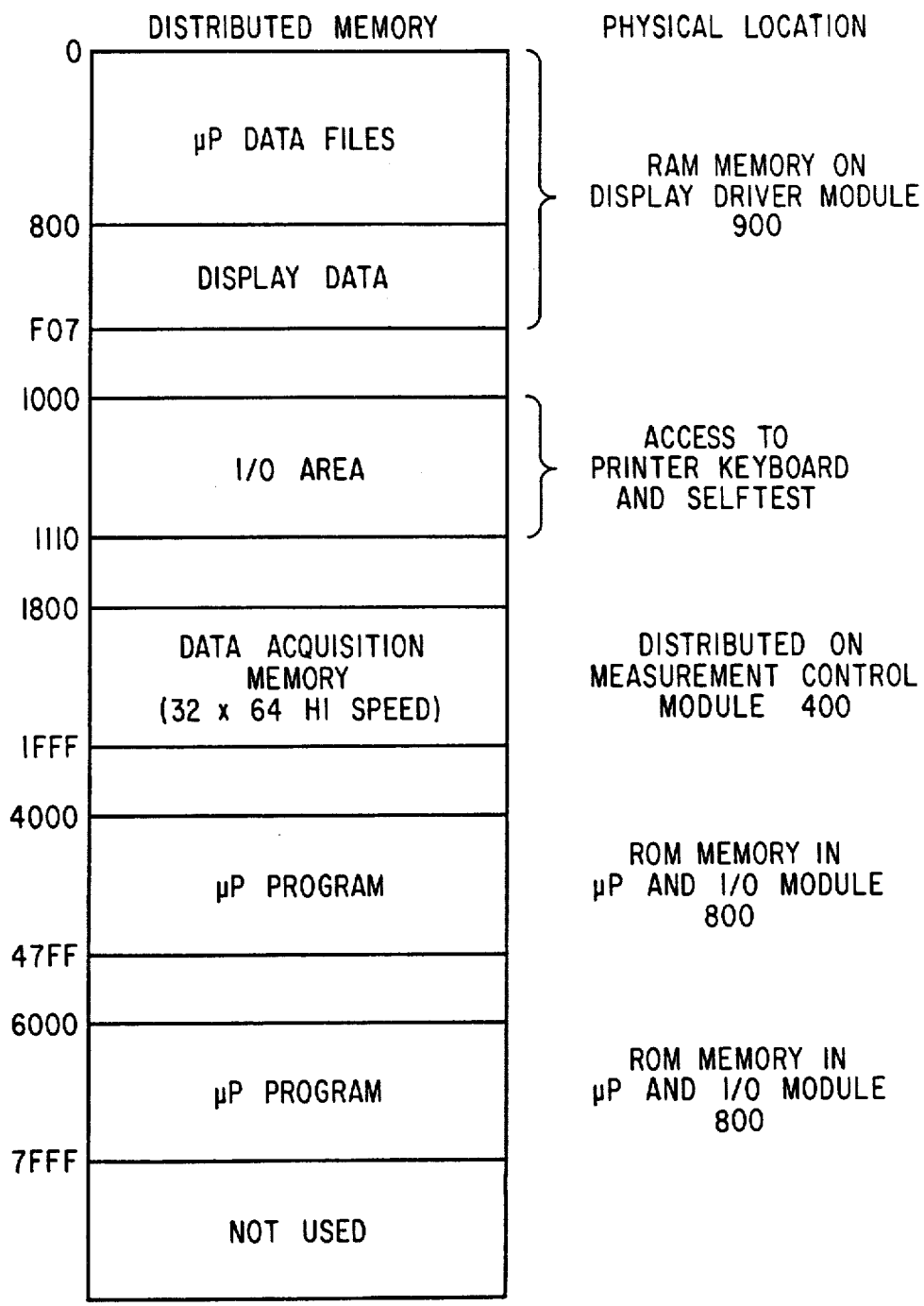
FIG. 8 illustrates the distributed memory addressing of the present invention.
Figure 9:
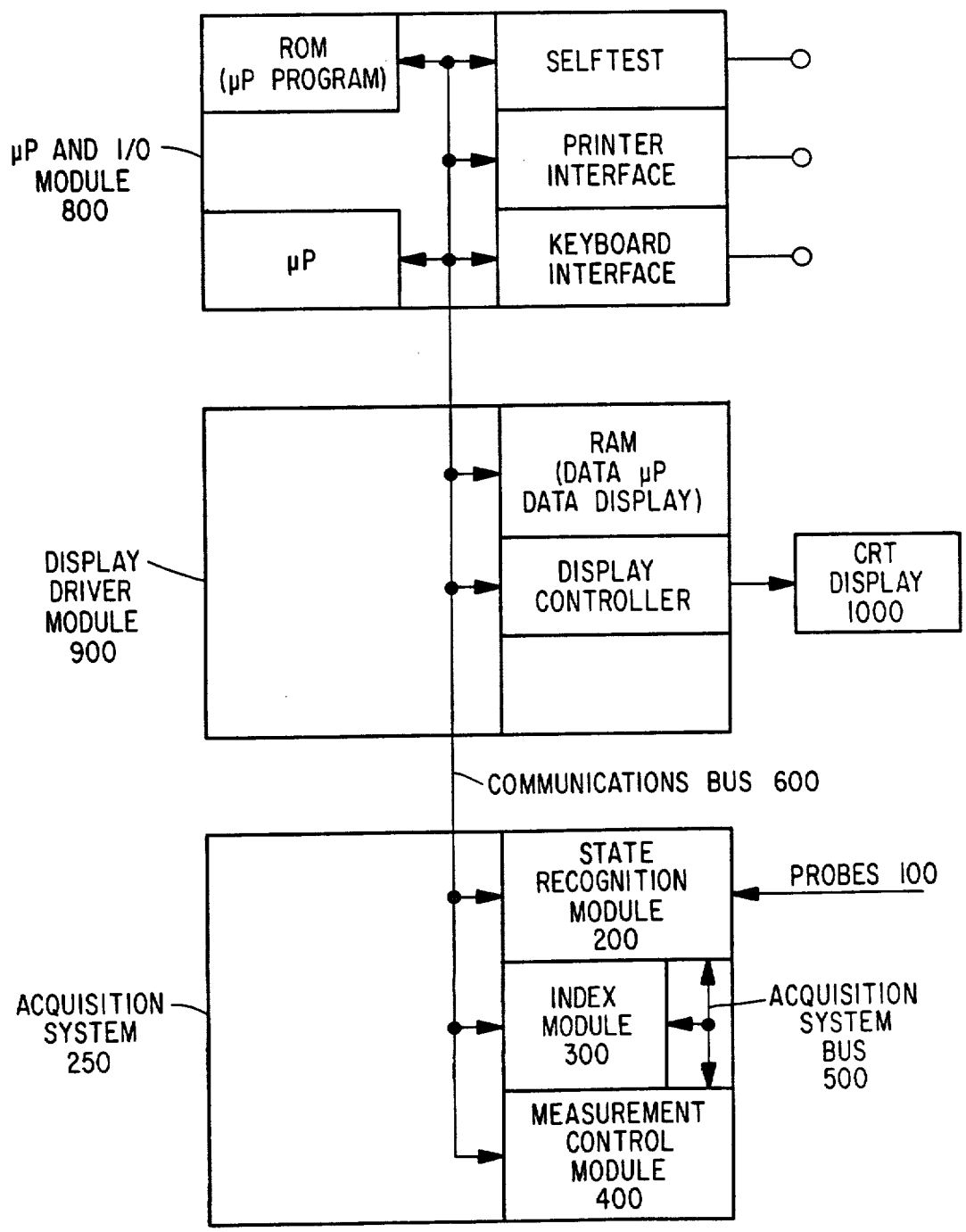
FIG. 9 illustrates the relationship between physical and logical addresses of the distributed memory of FIG. 8.

The modules of the acquisition system 250 communicate with other system modules via the communications bus 600, which provides a means for addressing selected modules and for transferring selected data. The entire system functions as a distributed memory, as illustrated in FIG. 8. For instance, addresses between 1800 and 1FFF on the communications bus 600 access the state count measurements and the sampled data states stored in the measurement control module 400 memories. FIG. 9 shows another representation of the system architecture, illustrating the relationship between the physical couplings of FIG. 7 and the logical addresses of FIG. 8.

Figure 10:
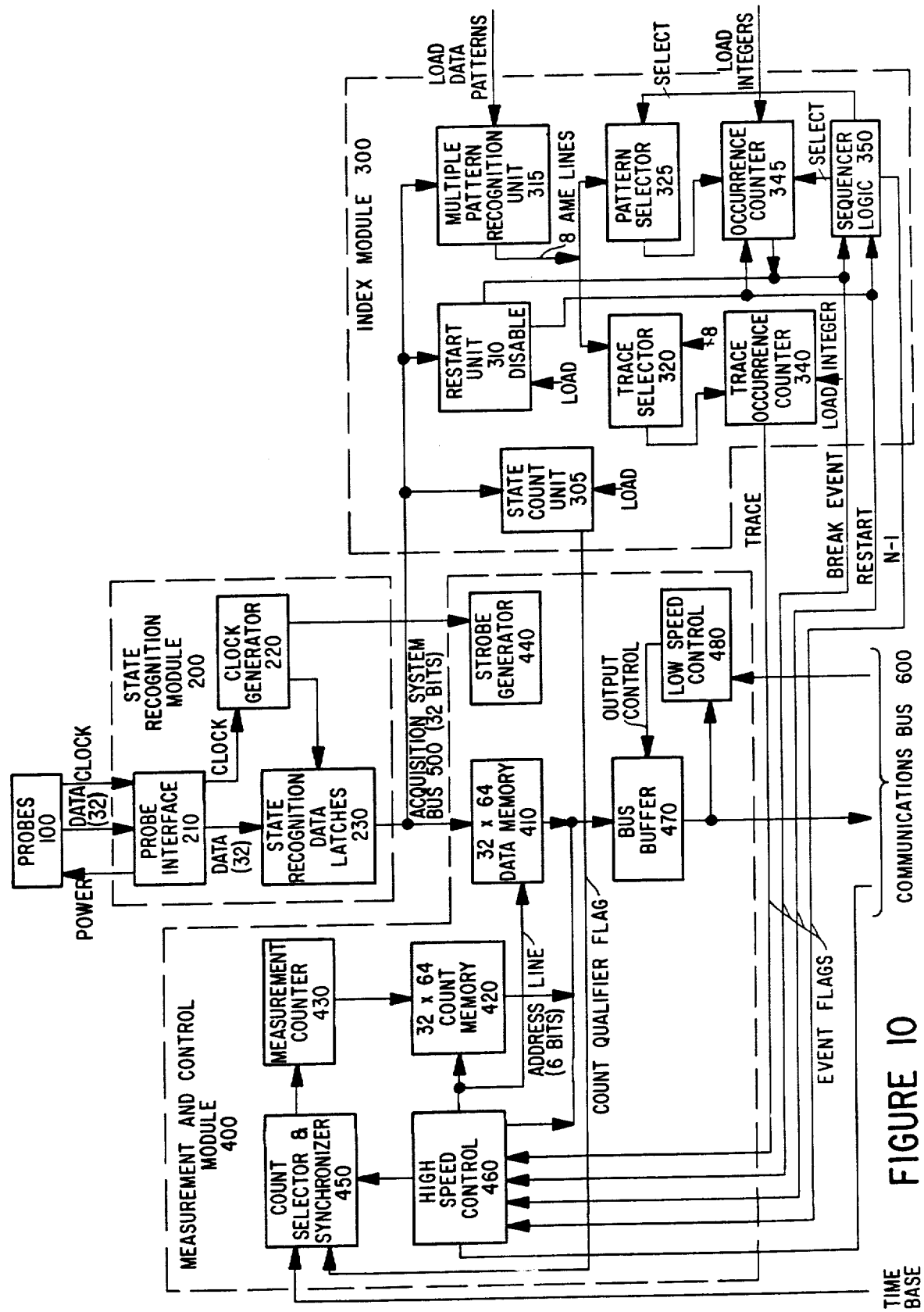
FIG. 10 is a block diagram of the acquisition system.
Figure 11:
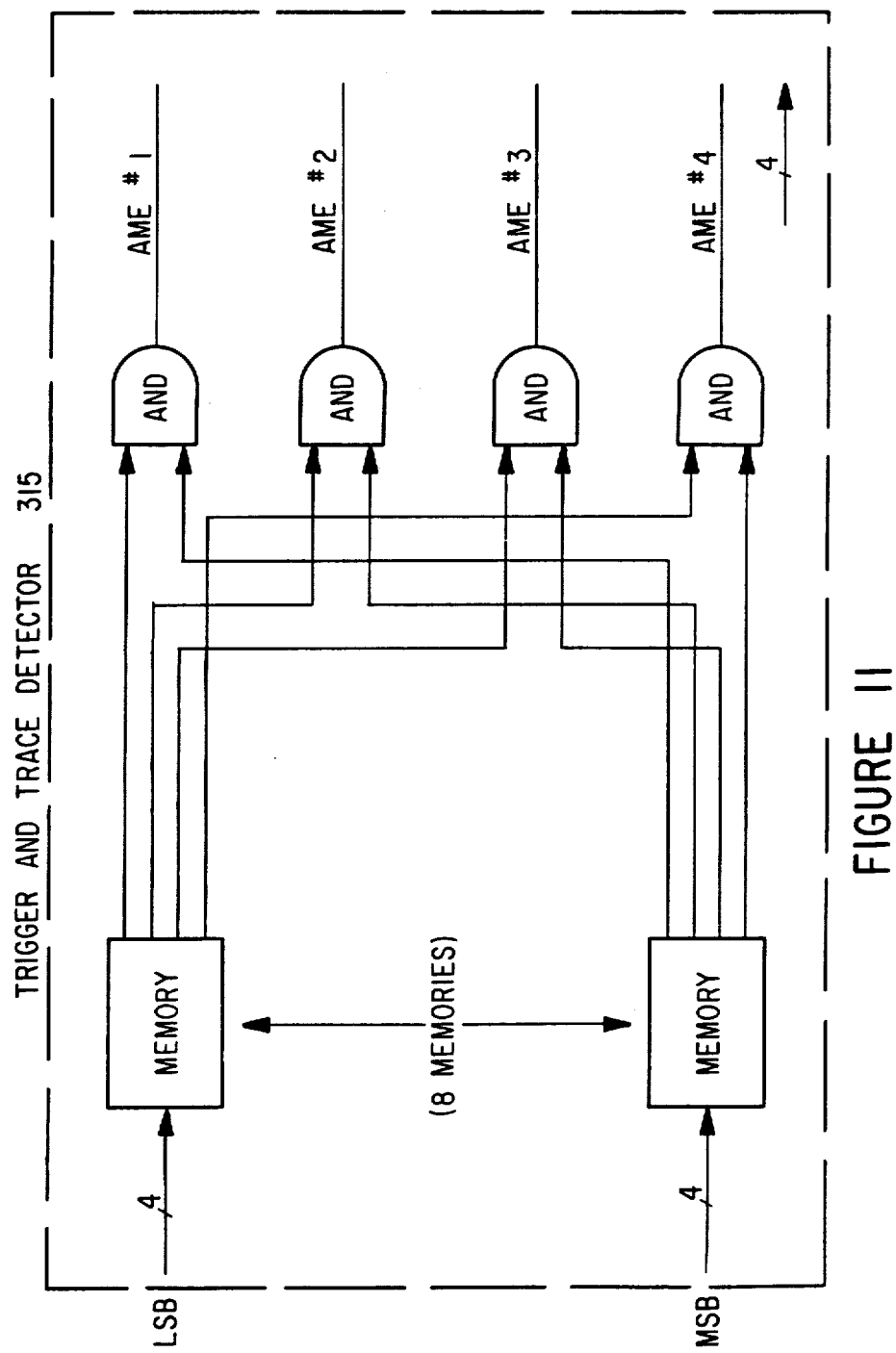
FIG. 11 illustrates a multiple pattern recognition unit.
Figure 12:
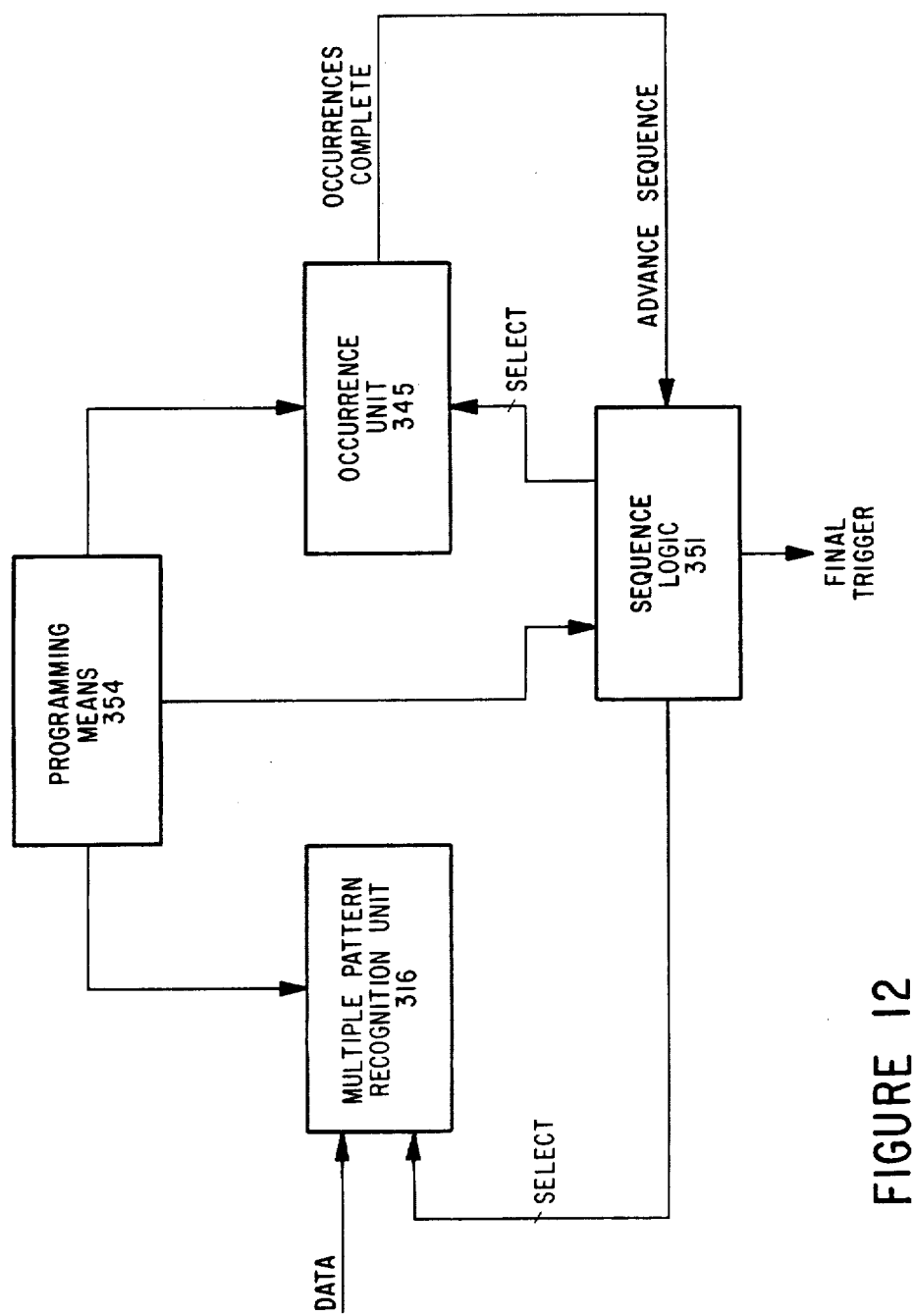
FIG. 12 illustrates a simplified sequential triggering circuit.

Referring to FIG. 10, the index module 300 detects the trace position by first comparing the sampled state on the acquisition system bus 500 with a qualifier state condition stored in the multiple pattern recognition unit 315. The multiple pattern recognition unit 315 comprises a digital pattern triggering circuit as described the copending patent application entitled "DIGITAL PATTERN TRIGGERING CIRCUIT", U.S. patent application Ser. No. 743,188 filed Nov. 19, 1976, by WILLIAM A. Farnbach, now U.S. Pat. No. 4,100,532. As illustrated in FIG. 11, the multiple pattern recognition unit 315 comprises 2 pairs of 8 sixteen by four bit memories providing for the detection of up to eight qualifier state conditions, where each qualifier state condition is identified by a 1, 0, X input, format (in binary). Pattern selector 325 of FIG. 10 selects one of the eight lines output from the multiple pattern recognition unit and passes the selected output to the occurrence counter 345. The occurrence counter 345 counts the occurrences of the selected qualifier state conditions and provides an output in response to counting a specified number of occurrences of the selected qualifier state condition. This output is termed a "break event" and the sequencer logic 350 in response requests the pattern selector 325 to select the next sequential qualifier state condition and requests the occurrence counter 345 to select the corresponding count. The sequencer logic 350 also outputs a "N-1" event flag in response to detection of the occurrence of the "NEXT TO LAST BREAK EVENT". A simplified sequential triggering circuit is illustrated in FIG. 12 where the multiple pattern recognition unit 316 incorporates the functions of the multiple pattern recognition unit 315 and of the pattern selector 325. The sequence logic 351 incorporates the functions of the sequence logic 350 except that the final trigger is output in response to the completion of the state sequence. Another method of implementing the multiple pattern recognition unit 316 would be to have 3 selector bits be the most significant bits in the address, allowing the comparator to sequence through various segments of memory when comparing sequential state conditions of the state sequence.

Referring again to FIG. 10, the selective trace is incorporated in a similar manner except that the trace selector 320 of FIG. 10 can "OR" any combination of the AME lines. A trace occurrence counter 340 outputs a trace event flag upon counting each "nth" "ORED" AME event.

The restart unit 310 causes the sequence logic 350 to restart the satisfaction of the state sequence subsequent to the detection of a selected restart state condition. The restart unit is disabled for the data state corresponding to the detection of a break event by sequencer logic 350 which permits the state sequence to be satisfied without any unspecified intermediate state by setting the restart state condition to "any state".

The state count unit 305 strobes a counter in the measurement control module 400 each time the selected state condition to be counted is detected.

Figure 13:
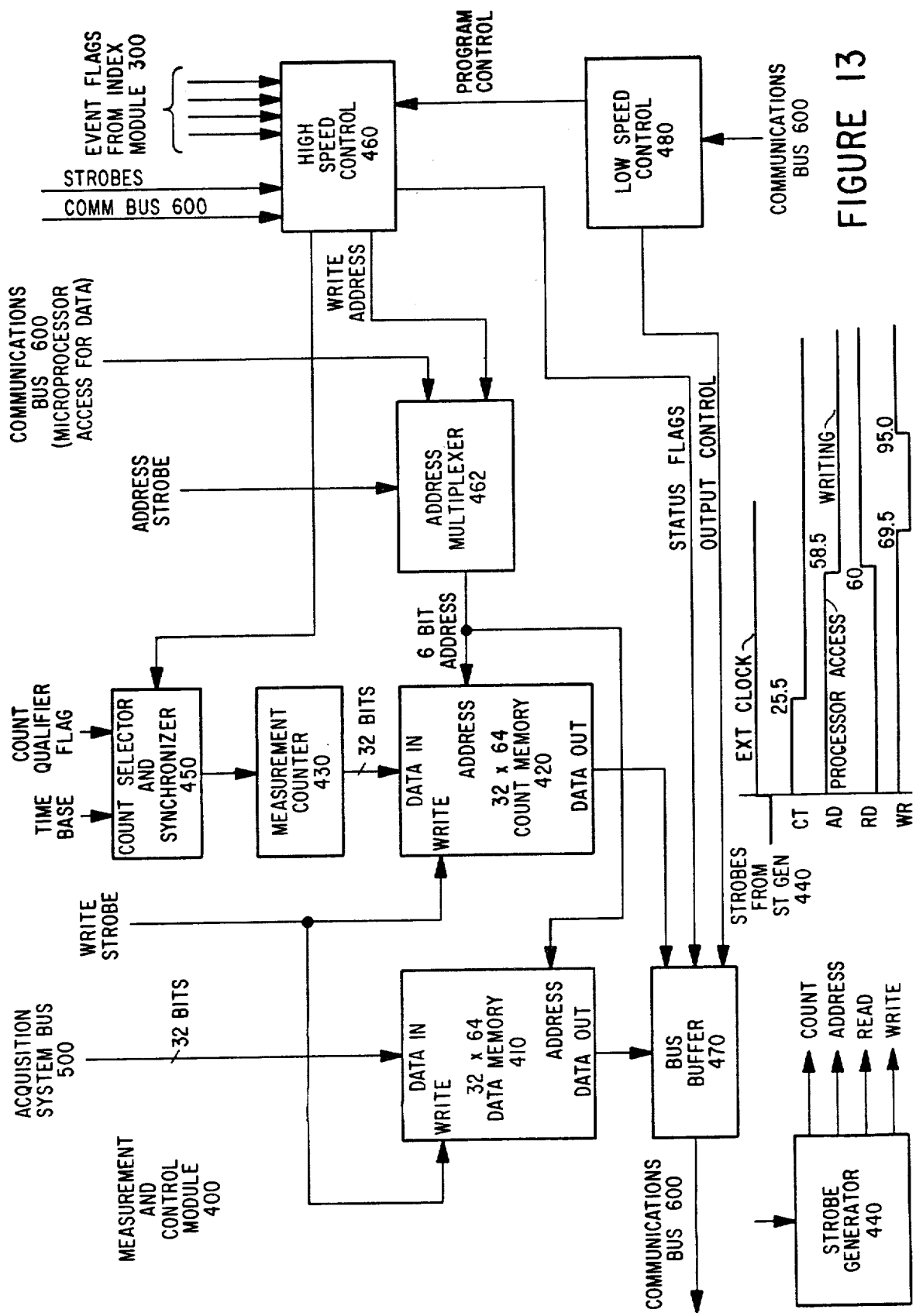
FIG. 13 illustrates the measurement and control module.
Figure 14:
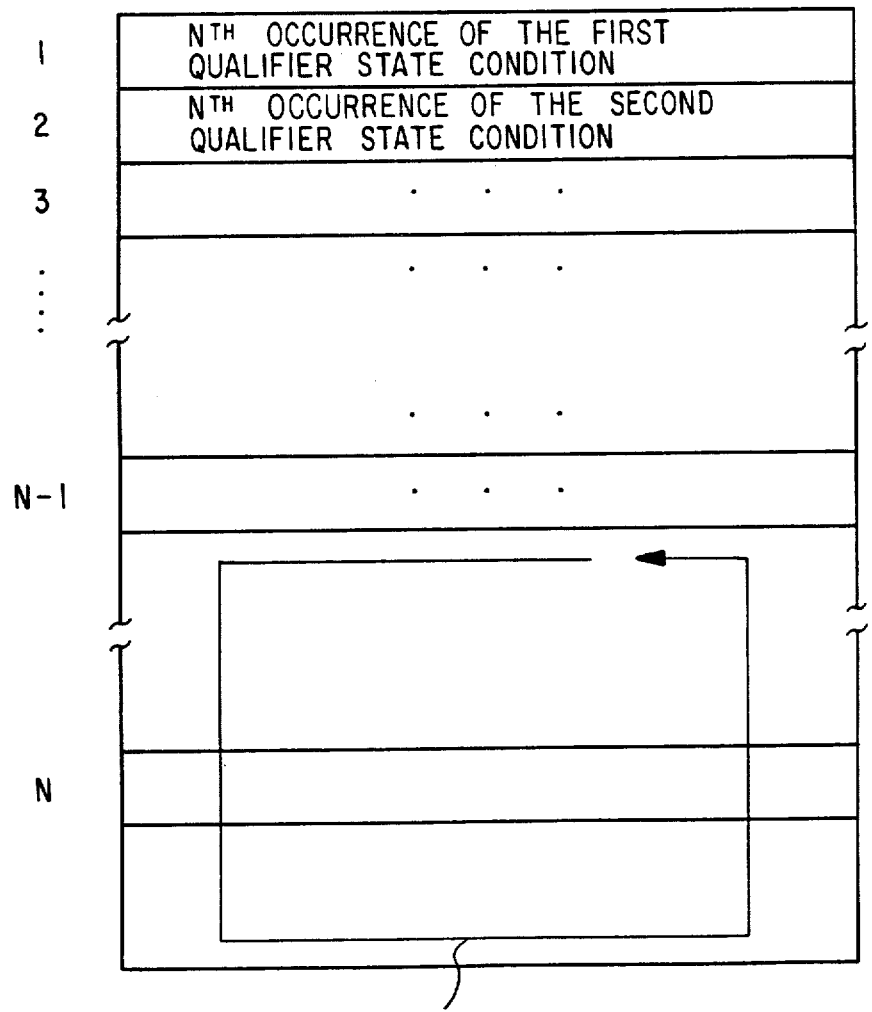
FIG. 14 illustrates the data format of the data memory.

The measurement and control module 400 is illustrated in FIGS. 10 and 13. The event flags from index module 300 are input to the high speed control 460 and determine which sampled states on the acquisition system bus 500 are to be stored. The high speed control 460 addresses the data memory 410 and the count memory 420 accordingly. FIG. 14 illustrates the data format of the data memory 410. The sampled state conditions resulting in break events are sequentially stored in locations 1—(N—1). Upon detection of the "N—1" event flag, sampled state conditions are sequentially written into the remaining memory locations, writing over the oldest data when the memory is filled. The trace position address of the memory location containing the state condition resulting in the final trigger is stored in a register and sampled states are written into the appropriate number of remaining storage locations. For example, if the trace was defined to end on the detection of the trace portion, no sampled states would be written subsequent to the detection of the trace position. The order of occurrence of the stored data is easily reconstructed by recovery of the trace position address appearing on the communications bus 600 as illustrated in FIG. 8. Count selector and synchronizer 450 controls the measurement counter 430, whose contents are stored in count memory 420 upon update of the memory address. The low speed control 480 provides a low speed interface for programming the high speed control 460 and for selecting and latching data for the communications bus 600 interface.

The strobe generator 400, illustrated in FIGS. 10 and 13, generates a sequence of strobes which, when coupled with a series of data latches (not shown) and timing logic (not shown) effectuate the orderly performance of machine tasks. In effect, a number of sampled states are simultaneously in various stages of processing at any one time and are "pipelined" through the required logic blocks.

APPENDIX A

| GENERAL DESCRIPTION - KEYBOARD |
|---|
| CURRENT MEASUREMENT DISPLAY<br>LINES 3 THROUGH 24 ARE DEPENDENT ON THE DISPLAYED MENU CHOSEN,<br>WHICH MAY BE SELECTED BY KEYS IN CURRENT MEASUREMENT BLOCK:<br>FORMAT SPECIFICATION    SELECT CLOCK SLOPE AND FORMAT 32 CHANNELS<br>                                  INTO LOGICAL LABELS, DESIRED LOGIC |

APPENDIX A-continued

GENERAL DESCRIPTION - KEYBOARD

| | |
|---|---|
| | POLARITY AND NUMERICAL BASE. |
| TRACE SPECIFICATION | DEFINE TRACE POSITION, SELECTIVE TRACE AND COUNT MEASUREMENT. |
| LIST | DISPLAY RESULTANT CURRENT TRACE AND COUNT DATA. |
| GRAPH | GRAPH RESULTANT CURRENT TRACE DATA FOR SELECTED LABEL. THE 20 INTENSIFIED DOTS CORRESPOND TO TRACE LIST DATA. |
| COMPARE | DISPLAY THE "EXCLUSIVE OR" OF VALID CURRENT |
| VS | DATA WITH VALID STORED DATA, AND SELECT |
| STORE | COMPARED TRACE MODE. |
| ROLL DISPLAY | VIEW TRACE LIST OR TRACE COMPARE DATA. TRACE GRAPH SHOWS INTENSIFIED DOTS THAT |
| ←GRAPH  GRAPH→ | REPRESENT THE TRACE LIST DATA DISPLAYED. |
| ENTRY | |
| ALL PROGRAM ENTRIES ARE MADE IN INVERSE VIDEO FIELDS AT THE BLINKING CURSOR, AND MAY BE CHANGED BY THE ENTRY BLOCK OF KEYS: | |
| FIELD SELECT [ ] | ALL FIELDS ENCLOSED WITH BRACKETS [ ] ARE CHANGED BY THIS KEY. THE 1610A SELECTS ONLY ALLOWED CHOICES. |
| 0-9, A-F, X | ALL OTHER FIELDS MAY BE CHANGED USING THESE KEYS. |
| EDIT | |
| DISPLAYED MENUS MAY BE EDITED BY THE EDIT BLOCK OF KEYS: | |
| DELETE    INSERT | USED IN THE TRACE SPECIFICATION MENU ONLY TO OPTIONALLY DELETE OR INSERT STATES TO SPECIFY TRACE POSITION AND SELECTIVE TRACE. A MAXIMUM OF 8 STATES MAY BE USED BETWEEN TRACE POSITION AND SELECTIVE TRACE. |
| DEFAULT | RETURNS THE DISPLAYED MENU TO A KNOWN (PRESET, TRACEABLE) CONDITION. |
| INCR    DECR | USED IN TRACE GRAPH ONLY TO AUTOMATICALLY CHANGE UPPER OR LOWER GRAPH LIMITS. |
| ← ↑ ↓ → | USED TO MOVE THE BLINKING CURSOR TO A DESIRED FIELD. |
| EXECUTE | |
| THE REMAINING KEYS ARE THE EXECUTE BLOCK OF KEYS: | |
| CURRENT MEASUREMENT | ↓ KEY SAVES CURRENT SPECIFICATION AND DATA MEASUREMENT IN A STORED FILE. THE |
| STORED MEASUREMENT | CURRENT SPECIFICATION AND DATA REMAIN UNCHANGED. ↓ ↑ KEY EXCHANGES THE CURRENT AND STORED MEASUREMENT FILES. |
| PRINT | PRINTS THE CURRENT DISPLAY, EXCEPT TRACE GRAPH, ON AN HP 9866 LINE PRINTER. TRACE LIST AND TRACE COMPARE WILL PRINT THE CURRENT PAGE AND ANY REMAINING DATA IN MEMORY. |
| TRACE | EXECUTES THE CURRENT SPECIFICATION, AND IF DISPLAY IS THE FORMAT OR TRACE SPECIFICATION, THE 1610A SWITCHES THE DISPLAY TO TRACE LIST. IF TRACE IS HELD DOWN, THE MEASUREMENT IS TRACED CONTINUOUSLY. IF THE COMPARE TRACE MODE IS SET FOR [STOP=] OR [STOP#] THE MEASUREMENT IS TRACED UNTIL THE CONDITION IS MET. THE INSTRUMENT STATUS (1ST LINE) IS EITHER "COMPARED TRACE-FAILED", (IMPLIES CONDITION NOT MET) OR "COMPARED TRACE-COMPLETE" (IMPLIES CONDITION MET). |
| STOP | STOPS ANY MEASUREMENT TRACE, COMPARED TRACE OR PRINT IN PROCESS. |

APPENDIX B

DETAILED FIELD(S) DESCRIPTION

CLOCK SLOPE:
EXAMPLES:   CLOCK SLOPE [+]
            CLOCK SLOPE [−]
PURPOSE:    TO SELECT THE CLOCK TRANSITION USED TO STROBE POD DATA INTO THE
            1610A.
LABEL ASSIGNMENT AND ACTIVE CHANNELS:
EXAMPLE:        POD4         POD3         POD2         POD1
            7------0     7------0     7------0     7------0
            AAAAAAAA     AAAAAAAA     DDDDDDDD     XXXXXXXF
            !!!!!!!!     !!!!!!!!     !!!!!!!!            !
                            ACTIVE CHANNELS
PURPOSE:    TO ASSIGN LABELS A,B,C,D,E OR F TO ANY NUMBER OF

APPENDIX B-continued

DETAILED FIELD(S) DESCRIPTION

CONTINUOUS CHANNELS INDEPENDENT OF POD BOUNDARIES.
IN THE ABOVE EXAMPLE THE LABEL A IS ASSIGNED
TO 16 BITS OF POD3 AND POD4, AND MAY REPRESENT
A 16 BIT ADDRESS. LABEL D IS ASSIGNED 8 BITS
ON POD2 AND MAY REPRESENT AN 8 BIT DATA BUS. LABEL
F IS A SINGLE BIT QUALIFIER (READ/WRITE) AND IS
ASSIGNED TO THE LEAST SIGNIFICANT BIT ON POD1.
ANY UNUSED CHANNELS MAY BE TURNED OFF BY PUTTING AN "X"
IN THOSE CHANNELS.

COMMENT: AS MANY AS SIX LABELS OR AS FEW AS ONE MAY BE ASSIGNED
ACROSS THE 32 CHANNELS. IF A LABEL IS SPLIT, SUCH AS
      AABBBAAA      (LABEL IS NOT CONTINUOUS)
THEN AN ERROR MESSAGE "ERROR-SPLIT LABEL" IS DISPLAYED
AND THE CURSOR IS LOCKED TO THE LABEL ASSIGNMENT FIELDS
UNTIL THE ERROR IS CORRECTED.
PRESSING THE DEFAULT KEY WILL ASSIGN LABEL F TO ALL 32
CHANNELS.
ACTIVE CHANNELS ARE SHOWN BY "!" MARKS FOR EACH ASSIGNED
CHANNEL. ABSENCE OF "!" INDICATES LOW CHANNEL (BIT)
ACTIVITY, AND IS A GOOD INDICATOR THAT A POD CLIP MAY
HAVE FALLEN OFF. CHANNEL ACTIVITY IS NOT DISPLAYED
WHILE 1610A IS TRACING.
IF A POD IS CONNECTED TO THE DATA PORT ON REAR OF 1610A,
THE CHANNEL ACTIVITY "!" FOR LEAST SIGNIFICANT 2 BITS
IS NOT SHOWN (DUE TO SYNCHRONOUS 8 BIT COUNT AND
1610A).

LOGIC POLARITY:
EXAMPLE:      LABEL      A   D   F
       LOGIC POLARITY  [−] [+]
               [−]
               (+, −)
PURPOSE: TO SELECT A LOGIC POLARITY FOR EACH ASSIGNED LABEL.

NUMERICAL BASE:
EXAMPLE:      LABEL      A   B   F
       NUMERICAL BASE  [HEX] [OCT] [BIN]
       (BIN, OCT, DEC, HEX)
PURPOSE: TO SELECT A NUMERICAL BASE OF HEXIDECIMAL (HEX),
OCTAL (OCT), DECIMAL (DEC), OR BINARY (BIN) FOR
EACH ASSIGNED LABEL.

TRACE POSITION:
EXAMPLE:  [START ] TRACE
           [CENTER] TRACE
           [END ] TRACE
PURPOSE: TO SELECT WHETHER THE TRACE STARTS, IS CENTERED
OR ENDS UPON A DESIGNATED STATE (WHICH MAY BE
CALLED THE TRIGGER STATE). ADDITIONALLY, THE
TRIGGER STATE MAY BE DEFINED TO BE A SPECIFIED
NUMBER OF OCCURRENCES OF A DESIGNATED STATE.

EXAMPLE:  LABEL            A    OCCUR
           BASE             HEX  DEC
           FIND IN SEQUENCE  10   00001
           THEN             20   00001
           THEN             30   00005
           [START] TRACE     40   00001
           SEQ. RESTART [ON]  50

COMMENT: THIS EXAMPLE HAS THE FOLLOWING MEANING FOR DEFINING
TRACE POSITION:
FIND IN SEQUENCE 00001 OCCURANCE OF STATE 10, THEN
THE 00001 OCCURANCE OF STATE 20, THEN THE 00005 OCCURANCE
OF STATE 30, AND [START] TRACE AT 00001 OCCURANCE
OF STATE 40.
IF DURING THIS SEQUENCE THE RESTART STATE 50 IS
ENCOUNTERED BEFORE REACHING THE 00001 OCCURANCE OF
STATE 40, THE MEASUREMENT RESTARTS TO AGAIN FIND IN SEQUENCE
THE 00001 OCCURANCE OF STATE 10, THEN 00001 OCCURANCE
OF STATE 20, ETC.
     NOTE:  IF A SEQUENCE STATE IS DEFINED TO BE THE SAME AS THE
              RESTART STATE, THE SEQUENCE STATE DOMINATES.
              IF [CENTER] OR [END] WERE SELECTED, SELECTIVE
              TRACE STARTS AT COMPLETION OF 5 OCCURANCES
              OF STATE 30 (SEE SELECTIVE TRACE).

SELECTIVE TRACE:
EXAMPLE:      LABEL      A   OCCUR
          [ALL STATES]
PURPOSE:   TO TRACE ALL STATES.
EXAMPLE:   LABEL         A   OCCUR
           BASE         HEX  DEC
  TRACE
  [ONLY STATE]     60   00001
  OR                 7X
  OR                 8X

APPENDIX B-continued

DETAILED FIELD(S) DESCRIPTION

PURPOSE: TO SELECTIVELY TRACE DESIRED STATES; STATES NOT MEETING THE SELECTION CRITERIA ARE SIMPLY NOT INCLUDED IN THE TRACE.
COMMENTS: THE ABOVE EXAMPLE HAS FOLLOWING MEANING:
DO A SIMULTANEOUS TRACE OF 00001 OCCURANCE
OF STATES 60 OR 7X (70 TO 7F) OR
8X (80 TO 8F).

COUNT:
EXAMPLE:  LABEL    A
          BASE     HEX
    COUNT [OFF]
    COUNT [STATE]  7X
    COUNT [TIME]

PURPOSE: TO SELECT COUNT MEASUREMENT TO BE [OFF], OR IF ON, TO BE COUNT [STATE] OR COUNT [TIME].
COMMENT: WHEN COUNT IS [OFF], THE TRACE LIST DOES NOT SHOW COUNT DATA FOR THE NEXT TRACE MEASUREMENT.
WHEN COUNT [STATE] IS SELECTED A 32 BIT COUNT OF THE SELECTED STATE 7X (70 TO 7F) IS STORED IN MEMORY WITH EACH POD DATA STATE STORED. THE RESULTANT COUNT DATA IS DISPLAYED IN THE TRACE LIST FOR THE NEXT TRACE MEASUREMENT.
WHEN COUNT [TIME] IS SELECTED A COUNT VALUE OF TIME IS STORED FOR EACH POD DATA STATE STORED IN MEMORY. THE RESULTANT TIME DATA IS DISPLAYED IN THE TRACE LIST FOR THE NEXT TRACE MEASUREMENT

STATE COUNT OR TIME [ABS], [REL]:
EXAMPLE:   LABEL      A      STATE COUNT
           BASE       HEX       DEC
                                [ABS]
    SEQUENCE          10    —  1043
    SEQUENCE          20    —  1033
    SEQUENCE          30    —  1023
    START             40        0
    +01               60    +   20
    +02               70    +   30
    +03               71    +   31
      .                .        .
      .                .        .
      .                .        .

LABEL      A      STATE COUNT
           BASE       HEX       DEC
                                [REL]
    SEQUENCE          10
    SEQUENCE          20                       10
    SEQUENCE          30                       20
    START             40                      1023
    +01               60                       20
    +02               70                       10
    +03               71                        1
      .                .                        .
      .                .                        .
      .                .                        .

LABEL      A      TIME
           BASE       HEX    DEC
                             [ABS]
    SEQUENCE          10   —  208.3 US
    SEQUENCE          20   —  200.2 US
    SEQUENCE          30   —  185.1 US
    START             40       .0 US
    +01               60   +  80.0 US
    +02               70   + 120.9 MS
    +03               71   + 122.5 MS
      .                .        .
      .                .        .
      .                .        .

PURPOSE: TO VIEW THE TRACE LIST AND SELECT [ABS] OR [REL] FOR THE STATE COUNT OR TIME DATA.
COMMENTS: WHEN ABSOLUTE [ABS] IS SELECTED THEN EACH STATE COUNT OR TIME IS DISPLAYED IN +/− ABSOLUTE VALUES WITH RESPECT TO THE START STATE 40. ALL STATES BEFORE THE START STATE 40 ARE SHOWN WITH "−" COUNT VALUES. START STATE 40 IS SHOWN AS ALWAYS 0. ALL STATES SHOWN AFTER THE START STATE 40 ARE SHOWN WITH "+" COUNT VALUES.
WHEN RELATIVE [REL] IS SELECTED, THEN EACH STATE COUNT OR TIME IS DISPLAYED SHOWING COUNT VALUES RELATIVE TO THE PREVIOUS STATE COUNT VALUE (IF VALID) WITHOUT SIGN.

GRAPHED LABEL:
EXAMPLE:
          GRAPHED LABEL [A]

APPENDIX B-continued

DETAILED FIELD(S) DESCRIPTION

|  | GRAPHED LABEL [F] |
|---|---|
| PURPOSE: | TO SELECT A DEFINED LABEL A,B,C,D,E, OR F TO BE GRAPHED. |
| UPPER/LOWER LIMITS: | |
| EXAMPLE: | |
|  | UPPER LIMIT |
|  | 177 |
|  | LOWER LIMIT |
|  | 000 |
| PURPOSE: | TO CHANGE THE UPPER OR LOWER GRAPH LIMITS. |
| COMMENT: | GRAPH LIMITS MAY BE CHANGED USING ENTRY KEYS OR THE LIMITS MAY BE AUTOMATICALLY INCREMENTED OR DECREMENTED USING THE INCR OR DECR KEYS IN THE EDIT BLOCK. THE UPPER LIMIT MUST BE GREATER THAN LOWER LIMIT, OR ELSE AN "ERROR-OVERLAPPING LIMITS" IS DISPLAYED IN PLACE OF THE GRAPH, WHICH IS NOT DISPLAYED. |
| COMPARED TRACE MODE: | |
| EXAMPLE: | LABEL   A   COMPARED<br>BASE   HEX   TRACE MODE<br>                        [OFF]<br>SEQUENCE   00<br>SEQUENCE   00<br>SEQUENCE   00<br>START   00<br>+01   30<br>+02   00 |
| PURPOSE: | TO SHOW THE "EXCLUSIVE OR" OF CURRENT DATA WITH STORED DATA. ALL ZEROS IMPLIES THAT THE SAME DATA IS IN BOTH FILES, WHILE ANYTHING ELSE (30) SHOWS DATA STATES IN THE TWO TRACES WHICH ARE NOT EQUAL (BITS 4 AND 5, ASSUMING THAT THE LSB IS BIT 0). |
| EXAMPLE: | LABEL   A   COMPARED<br>BASE   HEX   TRACE MODE<br>                        [STOP=]<br>LABEL   A   COMPARED<br>BASE   HEX   TRACE MODE<br>                        [STOP#] |
| PURPOSE: | TO SELECT THE COMPARED TRACE MODE TO BE STOP WHEN EQUAL [STOP=], OR STOP WHEN NOT EQUAL [STOP#]. |
| COMMENTS: | WHEN [STOP=] IS CHOSEN THE MEASUREMENT IS TRACED REPEATEDLY UNTIL THE VALID CURRENT DATA EQUALS THE VALID STORED DATA. THE STATUS OF INSTRUMENT WILL BE "COMPARED TRACE-FAILED" WHICH MEANS THAT THE CURRENT DATA DOES NOT EQUAL THE STORED DATA. THE 1610A THEN TRACES AGAIN SHOWING "COMPARED TRACE-IN PROCESS" AND COMPARES ANOTHER SET OF TRACE DATA. THIS PROCESS CONTINUES UNTIL THE STATUS IS "COMPARED TRACE-COMPLETE" WHICH MEANS THE VALID CURRENT FILE TRACE DATA EQUALS THE VALID STORED FILE TRACE DATA. A SIMILAR OPERATION EXISTS FOR [STOP#], EXCEPT ITS MEASUREMENT CONTINUES UNTIL FILES DO NOT COMPARE. NOTE: THIS IS NOT A REAL-TIME MEASUREMENT, BUT RATHER A "SAMPLED COMPARED MODE" THAT IS DEPENDENT IN PART UPON DATA CLOCK RATES AND TRACE SPECIFICATION. THIS MEASUREMENT MODE MUST BE TURNED [OFF] TO OBTAIN THE SINGLE OR CONTINUOUS TRACE MODES. |

We claim:

1. In a mechanism having a plurality of operator selectable modes of operation, mode selection apparatus comprising:

display means for displaying upon a viewable surface a legend within a mode specification portion of the viewable surface and also for displaying a cursor positionable to the mode specification portion of the viewable surface;

cursor positioning means, responsive to an operator's indication of a desired location of the cursor, for producing a cursor position signal indicative of the desired cursor position;

mode selection means, responsive to the operator's indication that a different mode of operation is to be a selected mode of operation, for producing a mode selection signal indicative that a different mode of operation is to be the selected mode of operation; and processing means coupled to each of the means recited above and comprising:

cursor production means, responsive to the cursor position signal, for producing upon the display means a cursor positionable to the mode specification portion of the viewable surface;

legend production means, responsive to the mode selection signal and the position of the cursor, for causing the legend displayed in the mode specification portion of the viewable surface to be one of a plurality of separate legends each associated with a different selectable mode of operation and also for responding to actuation of the mode selection means during times when the cursor is positioned to the mode specification portion of the viewable surface by replacing the displayed legend with a different legend from the plurality of separate legends; and means, responsive to the legend displayed in the mode specification portion of the viewable surface, for altering internal conditions within the mechanism to correspond to the mode of operation associated with the different legend displayed in the mode specification portion of the viewable surface.

2. Mode selection apparatus as in claim 1 wherein:

the display means is additionally for displaying a user supplied parameter within a parameter specification portion of the viewable surface;

the cursor produced by the cursor production means is additionally positionable to the parameter specification portion; and the apparatus further comprises entry means, responsive to the operator and to the location of the cursor, for entering into the parameter specification portion when the cursor is positioned thereto a user supplied parameter associated with the operation of the mechanism.

3. In a mechanism having a plurality of operator selectable modes of operation, mode selection apparatus comprising:

display means for displaying upon a viewable surface first and second legends within respective first and second mode specification portions of the viewable surface and also for displaying a cursor positionable to the first and second mode specification portions of the viewable surface;

cursor positioning means, responsive to the operator's indication of a desired location of the cursor, for producing a cursor position signal indicative of the desired cursor position;

mode selection means, responsive to the operator's indication that a different mode of operation is to be a selected mode of operation, for producing a mode selection signal indicative that a different mode of operation is to be the selected mode of operation; and processing means coupled to each of the means recited above and comprising:

cursor production means, responsive to the cursor position signal, for producing upon the display means a cursor positionable to the first and second mode specification portions of the viewable surface;

first legend production means, responsive to the mode selection signal and the position of the cursor, for causing the first legend displayed in the first mode specification portion to be one of a first plurality of separate legends each associated with a different selectable mode of operation and also for responding to actuation of the mode selection means during times when the cursor is positioned to the first mode specification portion by replacing the displayed first legend with a different legend from the first plurality of separate legends;

second legend selection means, responsive to the mode selection signal and the position of the cursor, for causing the second legend displayed in the second mode specification portion to be one of a second plurality of separate legends each associated with a different selectable mode of operation and also for responding to actuation of the mode selection means during times when the cursor is positioned to the second mode spcifiction portion by replacing the displayed second legend with a different legend from the second plurality of separate legends; and means, responsive to the legends displayed in the first and second mode specification portions of the viewable surface, for altering internal conditions wthin the mechanism to correspond to the modes of operation associated with the different legends displayed in the first and second mode specification portions of the viewable surface of the display.

4. Mode selection apparatus as in claim 3 wherein the cursor production means produces the cursor at only mode specification portions of the viewable surface of the display means.

5. Mode selection apparatus as in claim 27 wherein the processing means produces other indicia upon the viewable surface of the display means, wherein the first and second legends displayed respectively within the first and second mode specification portions of the viewable surface appear therein as inverse video, and wherein the cursor produced by the cursor production means is a region of blinking inverse video.

6. Mode selection apparatus as in claim 3 wherein:

the display means is additionally for displaying a user supplied parameter within a parameter specification portion of the viewable surface;

the cursor produced by the cursor production means is additionally positionable to the parameter specification portion; and the apparatus further comprises entry means, responsive to the operator and to the location of the cursor, for entering into the parameter specification portion when the cursor is positioned thereto a user supplied parameter associated with the operation of the mechanism.

7. Mode selection apparatus as in claim 6 wherein the cursor production means produces the cursor at only mode and parameter specification portions of the viewable surface of the display means.

8. Mode selection apparatus as in claim 7 wherein the processing means produces other indicia upon the viewable surface of the display means, wherein the first and second legends displayed respectively within the first and second mode specification portions and the user supplied parameter within the parameter specification portion appear therein as inverse video, and wherein the cursor produced by the cursor production means is a region of blinking inverse video.

9. In a mechanism having a plurality of operator selectable modes of operation, mode selection apparatus comprising:

display means for displaying upon a viewable surface a cursor and a selected one of first and second menus;

menu selection means, responsive to an operator's indication of which of the first and second menus is to be a selected menu, for producing a menu selection signal indicative of the selected menu;

cursor positioning means, responsive to the operator's indication of a desired location of the cursor, for producing a cursor position signal indicative of the desired cursor position;

mode selection means, responsive to the operator's indication that a different mode of operation is to be a selected mode of operation, for producing a mode selection signal indicative that a different mode of operation is to be the selected mode of operation; and processing means coupled to each of the means recited above and comprising:

menu production means, responsive to the menu selection signal, for producing upon the display means the selected one of the first and second menus, each menu including a legend within a mode specification portion of that menu;

cursor production means, responsive to the cursor position signal, for producing upon the display means a cursor positionable to the mode specification portion of the selected menu;

legend production means, responsive to the mode selection signal and the position of the cursor, for causing the legend displayed in the mode specification portion of each selected menu to be one of a respective plurality of separate legends, each legend thereof associated with a different selectable mode of operation within the selected menu, and also for responding to actuation of the mode selection means during times when the cursor is positioned to the mode specification portion of the selected menu by replacing the displayed legend with a different legend from the respective plurality of separate legends; and means, responsive to the legends displayed in the mode specification portions of the first and second menus, for altering internal conditions within the mechanism to correspond to the mode of operation associated with the different legend displayed in the mode specification portion of the selected menu.

10. Mode selection apparatus as in claim 9 wherein:
the display means is additionally for displaying a user supplied parameter within a parameter specification portion of the viewable surface;
the cursor produced by the cursor production means is additionally positionable to the parameter specification portion; and
the apparatus further comprises entry means, responsive to the operator and to the location of the cursor, for entering into the parameter specification portion when the cursor is positioned thereto a user supplied parameter associated with the operation of the mechanism.

11. Mode selection apparatus as in claim 10 wherein the cursor production means produces the cursor at only mode and parameter specification portions of the viewable surface of the display means.

12. Mode selection apparatus as in claim 11 wherein the processing means produces other indicia upon the viewable surface of the display means, wherein the legend displayed within the mode specification portion of the selected menu and the user supplied parameter within the parameter specification portion appear therein as inverse video, and wherein the cursor produced by the cursor production means is a region of blinking inverse video.

13. A method by which a mechanism having a plurality of selectable modes of operation interacts with an operator selecting and setting one of those modes, the method comprising the steps of:

designating a portion of a viewable surface of a display as a mode specification portion;
associating with the plurality of selectable modes of operation a like plurality of legends each of which is indicative of an associated mode of operation;
displaying within the mode specification portion the legend indicative of the current mode of mechanism operation;
displaying a cursor upon the display;
positioning the cursor to the mode specification portion of the viewable surface in response to appropriate operator actuation of a cursor positioning means;
replacing the legend displayed within the mode specification portion with a different legend from the plurality thereof in response to operator actuation of a mode selection key while the cursor is positioned to the mode specification portion; and
altering internal conditions within the mechanism to correspond to the mode of operation associated with the different legend.

14. A method as in claim 13 wherein:
the designating step additionally includes a parameter specification portion;
and the method further comprises the steps of:
positioning the cursor to the parameter specification portion in response to appropriate operator actuation of the cursor positioning means; and
entering a user supplied parameter associated with the operation of the mechanism into the parameter specification portion while the cursor is positioned thereto.

15. A method by which a mechanism having a plurality of selectable modes of operation interacts with an operator selecting and setting one of those modes, the method comprising the steps of:

designating portions of a viewable surface of a display as first and second mode specification portions;
associating with a first subset of the plurality of selectable modes of operation a first plurality of legends each of which is indicative of an associated mode of operation within the first subset;
associating with a second subset of the plurality of selectable modes of operation a second plurality of legends each of which is indicative of an associated mode of operation within the second subset;
displaying within the first mode specification portion a first legend belonging to the first plurality of legends and indicative of one current mode of mechanism operation;
displaying within the second mode specification portion a second legend belonging to the second plurality of legends and indicative of another current mode of mechanism operation;
displaying a cursor upon the display;
positioning the cursor to a selected one of the first and second mode specification portions of the viewable surface in response to appropriate operator actuation of a cursor positioning means;
replacing the legend displayed within the selected mode specification portion with a different legend from the associated plurality thereof in response to operator actuation of a mode selection key while the cursor is positioned to the selected mode specification portion; and altering internal conditions within the mechanism to correspond to the mode of operation associated with the different legend.

16. A method as in claim 15 wherein:

the designating step additionally includes a parameter specification portion;

and the method further comprises the steps of:

positioning the cursor to the parameter specification portion in response to appropriate operator actuation of the cursor positioning means; and entering a user supplied parameter associated with the operation of the mechanism into the parameter specification portion while the cursor is positioned thereto.

17. A method by which a mechanism having a plurality of selectable modes of operation interacts with an operator selecting and setting one of those modes, the method comprising the steps of:

displaying upon a viewable surface of a display a selected one of first and second menus each of which is associated with a respective first and second subset of the plurality of selectable mode of operation;

designating a portion of the displayed selected menu as a mode specification portion;

associating with the first and second subsets respective first and second pluralities of legends, each legend of which is indicative of a mode of operation within the associated menu;

displaying a cursor upon the display;

positioning the cursor to the mode specification portion of the selected menu in response to appropriate operator actuation of a cursor positioning means;

replacing the legend displayed within the mode specification portion with a different legend from the plurality thereof associated with the selected menu, such replacement being in response to operator actuation of a mode selection key while the cursor is positioned to the mode specification portion; and altering internal conditions within the mechanism to correspond to the mode of operation associated with the different legend.

18. A method as in claim 17 wherein:

the designating step additionally includes a parameter specification portion;

and the method further comprises the steps of:

positioning the cursor to the parameter specification portion in response to appropriate operator actuation of the cursor positioning means; and entering a user supplied parameter associated with the operation of the mechanism into the parameter specification portion while the cursor is positioned thereto.

* * * * *

UNITED STATES PATENT AND TRADEMARK OFFICE
CERTIFICATE OF CORRECTION

PATENT NO. : 4,479,197

DATED : October 23, 1984

INVENTOR(S) : George A. Haag, O. Douglas Fogg, Gordon A. Greenley, Steve A. Shepard, and F. Duncan Terry It is certified that error appears in the above-identified patent and that said Letters Patent is hereby corrected as shown below:

Column 1, line 32, "Farnbach" should read --Farnbach,--

Column 4, line 28, "(dont't care)." should read --(don't care).--

Column 6, line 16, "stroed" should read --stored--

Column 7, line 35, "Farnbach" should read --FARNBACH--

Appendix B, Columns 11 & 12, lines 28-31 currently reading as:
```
  Example:        Label              A    D    F
                  Logic Polarity    [-]  [+]
                  [-]
                  (+,-)
```
Should read as follows:
```
  Example:        Label              A    D    F
                  Logic Polarity    [-]  [-]  [+]
                  (+,-)
```

Column 18, line 11, "wthin" should read --within--

Column 18, line 20, "27" should read --4--

Signed and Sealed this

Second Day of April 1985

[SEAL]

Attest:

DONALD J. QUIGG

*Attesting Officer*   *Acting Commissioner of Patents and Trademarks*